(12) United States Patent  (10) Patent No.: US 7,289,035 B2
Nathan et al.                (45) Date of Patent:     Oct. 30, 2007

(54) SEAT FOLDING APPARATUS WITH A PASSIVE RADIO FREQUENCY LINK AND FOREIGN OBJECT DETECTION SYSTEM

(75) Inventors: John F. Nathan, White Lake, MI (US); Tom Q. Tang, Novi, MI (US); Riad Ghabra, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 244 days.

(21) Appl. No.: 11/161,028

(22) Filed: Jul. 20, 2005

(65) Prior Publication Data

US 2007/0018839 A1    Jan. 25, 2007

(51) Int. Cl.
*G08B 21/00* (2006.01)
(52) U.S. Cl. ............... 340/667; 340/666; 340/5.61; 340/5.72; 340/525.5; 340/426.28; 340/438; 340/457.1; 280/734; 280/735; 280/268; 702/152; 702/153; 702/173
(58) Field of Classification Search ............. 340/667, 340/666, 5.61, 5.72, 425.5, 426.28, 438, 340/457.1; 280/734, 735, 268; 702/152, 702/153, 173
See application file for complete search history.

(56) References Cited

U.S. PATENT DOCUMENTS

| 5,482,314 | A | 1/1996 | Corrado et al. |
| 5,570,903 | A | 11/1996 | Meister et al. |
| 5,678,854 | A | 10/1997 | Meister et al. |
| 5,712,625 | A | 1/1998 | Murphy |
| 5,812,399 | A * | 9/1998 | Judic et al. ............... 701/49 |
| 5,822,707 | A | 10/1998 | Breed et al. |
| 6,250,672 | B1 | 6/2001 | Ryan et al. |
| 6,369,529 | B1 * | 4/2002 | McClintock et al. ......... 318/16 |
| 6,540,295 | B1 | 4/2003 | Saberan et al. |
| 6,557,424 | B1 | 5/2003 | Morell |
| 6,677,538 | B2 | 1/2004 | Cook, Jr. et al. |
| 6,714,019 | B2 | 3/2004 | Kiribayashi et al. |
| 6,789,003 | B2 | 9/2004 | Magner et al. |
| 6,845,339 | B2 | 1/2005 | Winkler et al. |
| 2003/0231550 | A1 | 12/2003 | Macfarlane |
| 2004/0263154 | A1 | 12/2004 | Young et al. |

FOREIGN PATENT DOCUMENTS

| GB | 2 343 371 | 5/2000 |
| GB | 2 403 296 | 12/2004 |

OTHER PUBLICATIONS

GB Combined Search and Examination Report for Application GB 0614311.9 (corresponding to U.S. Appl. No. 11/161,028) dated Nov. 24, 2006.

* cited by examiner

*Primary Examiner*—Tai Nguyen
(74) *Attorney, Agent, or Firm*—Brooks Kushman P.C.

(57) ABSTRACT

A seat folding apparatus is provided with a passive Rf frequency link that requires that a person be within a certain limited distance from the vehicle to operate the seat folding mechanism. A foreign object detection system, such as a plurality of weight sensors, is provided in the seat to detect foreign objects on the seat.

6 Claims, 3 Drawing Sheets

SEAT FOLDING APPARATUS WITH A PASSIVE RADIO FREQUENCY LINK AND FOREIGN OBJECT DETECTION SYSTEM

BACKGROUND OF THE INVENTION

1. Field of the Invention

The present invention relates to an electronic control system for a vehicle seat that is convertible between different positions such as a seat position and a load floor position.

2. Background Art

A wide variety of vehicle seating arrangements are available for vans, minivans, and sport utility vehicles ("SUVs"). Vehicle seating systems may add versatility to vehicles that is derived from the ability to provide different seating configurations. Vehicle seating systems may include seats that are used in a conventional seating configuration or may be converted to provide a full or a partial load floor for hauling cargo. Some minivans are provided with removable seats that are releasably connected to anchoring devices secured to the vehicle compartment pan. More recently, seats are available that may fold into recesses in compartment pans to provide a continuous load floor without the need to remove the seats from the vehicle. Some seats are foldable into a console position with the seat back being folded forward over the seat base.

Most vehicle seating systems are manual and require a person to release a lever and reposition various portions of the seat to convert the seat to different modes. A recent innovation is the introduction of power folding seats such as that disclosed in U.S. Pat. No. 6,540,295 that is assigned to the assignee of this application. The power folding seat disclosed in this patent includes an electric motor that rotates the seat back between an upright, slanted seat back position and a generally horizontal load floor position. The motor used to fold the seat may be provided with a voltage regulator that monitors the voltage across the motor that may increase if a foreign object is encountered by the seat as it is moved by the motor. If a foreign object is contacted by the seat, the seat folding mechanism may attempt to continue the folding operation until the motor stalls. The motor stall condition is detected by the voltage regulator that interrupts operation of the motor. Folding a seat into a foreign object may damage the seat or the object.

The '295 patent also discloses the concept of operating the power folding seat upon receipt of an RF signal from an RF transmitter such as a key FOB. The '295 patent also discloses that location sensors may be provided upon various parts of the seat structure to be sure that the movable panels of the seat system are in the proper position for a given folding operation.

The seat system disclosed in the '295 patent is currently in production as the 2005 Cadillac SRX® sport utility vehicle. As currently produced, the seat has a manually actuated switch that must be held in to complete the folding operation. If the operator releases the switch during the folding operation, the seat folding operation is immediately interrupted to prevent damage to the seat folding mechanism or objects located on or around the seat. Some customers have indicated the desire to provide a power folding seat that does not require them to continuously hold the seat actuation button during the seat folding operation. Yet it is desirable to have an operator near a power folding seat as it folds to avoid problems that may be observed by a person as the seat is folded and unfolded. There is a need for a power seat folding system that does not require an operator to continuously hold a switch during an entire seat folding operation but will not operate unless the person is within close proximity to the vehicle during the folding operation.

Another problem associated with power seat folding mechanisms is that no feedback is typically provided to a user in the event the seat folding operation is unsuccessful. If, for example, the seat folding mechanism engages a foreign object and the motor stalls, the operator may not understand why the seat folding operation was interrupted. The operator also may not understand why the seat did not completely fold if the seat folding operation begins, but then terminates because the operator failed to continue to hold the button in during the entire folding operation. An operator may return the vehicle for service when no service is actually necessary if they do not understand why the seat folding operation was interrupted. There is a need for a power folding seat system that provides feedback to an operator in the event a seat folding operation is interrupted or to confirm that a seat has been moved to its fully folded or fully upright position for use as a seat.

These and other problems are addressed by Applicants' invention as summarized below.

SUMMARY OF THE INVENTION

According to one aspect of the present invention, a system for controlling movement of a power-driven seat folding apparatus in a vehicle is disclosed. A motor that drives the seat folding apparatus is controlled by an electronic seat control module. The system comprises a plurality of weight sensors disposed on the seat base that provide a foreign object signal to the electronic seat control module when a foreign object of more than a predetermined weight is disposed on the seat base. The electronic seat control module provides an interrupt signal to the power-driven folding apparatus that stops operation of the power-driven folding apparatus after the foreign object signal is received from one or more of the weight sensors.

According to other aspects of the invention, the electronic seat control electronically monitors the plurality of weight sensors to sum an electrical characteristic of each of the weight sensors. The seat control monitors change in the sum prior to or during operation of the power-driven folding apparatus to detect the foreign object on the seat. During operation of the power-driven folding apparatus, if a lightweight object of less than the predetermined weight is disposed on the seat, but is pressed against the seat, added pressure is applied to the seat. If the added pressure meets or exceeds the pressure applied by the foreign object of more than the predetermined weight, a foreign object signal may be provided to the electronic seat control module.

According to other aspects of the present invention, a plurality of weight sensors may be secured to a substantially rigid support structure of the seat that supports a foam bun with the weight sensors being disposed below the foam bun. The weight sensors may be attached to a tray that is installed on top of the support structure. Alternatively, the support structure may have at least one opening and the plurality of weight sensors may be attached to a sensor tray that is installed beneath the support structure with the weight sensors aligned with the at least one opening or openings.

According to other aspects of the invention, the electronic control module may monitor the weight sensors until a desired position is obtained at the end of a seat folding operation.

A switch for initiating operation of the power-driven folding apparatus may establish a latched circuit for the folding apparatus that is released when the seat folding operation is completed. The latched circuit may also be released in the event the foreign object signal is received by the control module. A seat folding operation also may be prevented in the event an ignition key is placed in the vehicle ignition switch.

At least one manually actuated switch may be actuated to override the power-driven folding seat operation and allow manual folding of the seat.

According to another aspect of the invention, an operator perceptible output mechanism is provided that communicates status information regarding the status of the power-driven folding apparatus in the event operation of the power-driven folding apparatus is interrupted. The operator perceptible output mechanism may be a display panel on a key fob Rf transmitter or on the vehicle dashboard. The operator perceptible output mechanism may also be an audio output.

According to another aspect of the present invention, a system for controlling movement of a seat disposed in a vehicle that has a power-driven folding apparatus controlled by an electronic seat control module is provided. The system comprises a manually actuated switch that is actuated to initiate operation of the power-driven folding apparatus. The switch may be released after actuation during operation of the power-driven folding apparatus without effecting operation of the apparatus. A transponder is carried by a user of the vehicle. A transmitter/receiver communicates with the transponder and provides a proximity signal when the transponder is within a limited distance from the transmitter/receiver. The proximity signal is provided to the electronic seat control module. The electronic seat control module prevents operation of the power-driven folding apparatus when no proximity signal is provided to the electronic seat control module.

According to other aspects of the method of the invention, the transponder may be part of a passive entry Rf system that is operative to unlock the vehicle when the proximity signal is received. Operation of the power-driven folding apparatus is permitted to continue until completed unless the transponder is moved beyond the limited distance from the transmitter/receiver.

The transponder may have a plurality of manually-actuated switches that may be actuated to stop operation of the power-driven folding apparatus during operation of the apparatus. Alternatively, a manually actuated switch may be assembled to the vehicle and may be actuated to stop operation of the power-driven folding apparatus during operation of the folding apparatus.

An operator perceptible output mechanism may be used to communicate status information to the user regarding status of the power-driven folding apparatus in the event the electronic seat control module prevents operation of the power-driven folding apparatus.

These and other aspects of the present invention will be better understood in view of the attached drawings and the following detailed description of the illustrated embodiment.

DETAILED DESCRIPTION OF THE PREFERRED EMBODIMENTS

Figure 1:
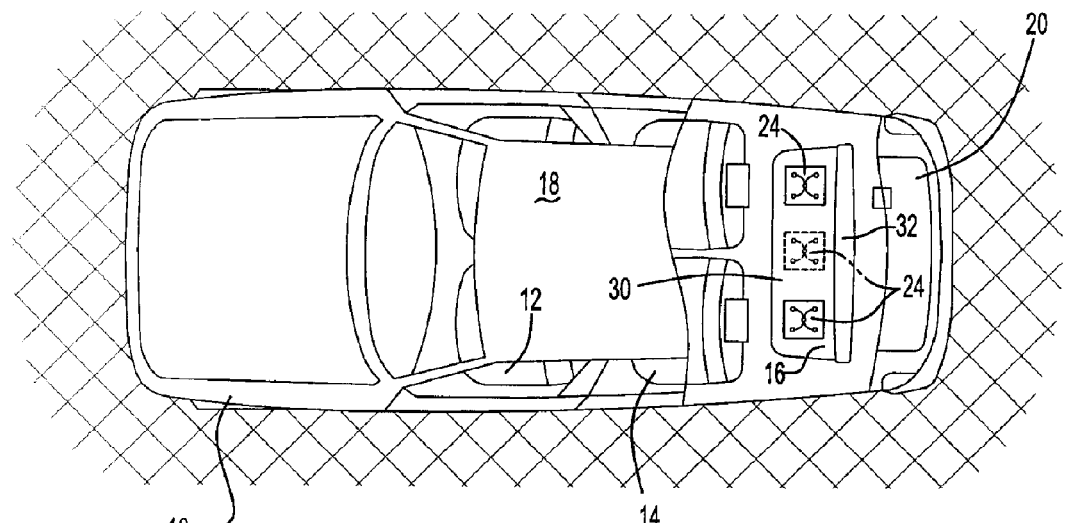
FIG. 1 is a partially fragmented top plan view of a vehicle having three rows of seats with the third row of seats being provided with an array of weight sensors.

Referring to FIG. 1, a vehicle 10 such as a minivan, sport utility vehicle, or other vehicle having seats that may be folded into a cargo-carrying configuration is illustrated. The vehicle shown in FIG. 10 has a first row of seats 12, a second row of seats 14, and a third row of seats 16. The roof 18 and hatchback 20 of the vehicle 10 is partially cut-away in FIG. 1 to reveal the third row of seats 16. The third row of seats 16 is provided with a plurality of weight sensor arrays 24. For example, the third row 16, as illustrated, has three weight sensor arrays 24 that are disposed in the base 30 of the third row seat 16. The back 32 of the third row seat 16 is shown in its generally upright or seating position.

Figure 2:
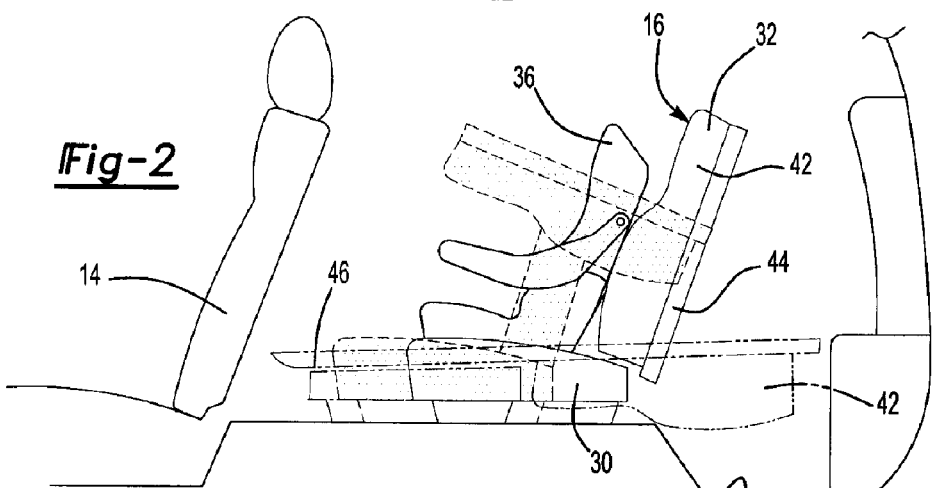
FIG. 2 is a diagrammatic side elevation view of the rear seat of a vehicle having a child seat disposed in the rear seat and also showing the rear seat in several different positions.

Referring to FIG. 2, a third row of seats 16 is shown with a child seat 36 in the seat 16. Child seats 36 are provided for transporting children and infants in a vehicle. Child seats 36 are generally left in a vehicle when not in use and may be forgotten if an operator is not careful when using a power-folding seat. With manual folding seats, the operator must unlock and release the seat parts to fold the seat and will ordinarily be able to observe foreign objects such as a child seat 36 as the seat is folded into a cargo-carrying position. With recently developed power-folding seats, the seat folding operation begins with a push of a button, but an operator may forget that a child seat or other foreign object is on the seat. If a power-folding seat engages a foreign object as it is moved, it may damage the seat, the seat folding mechanism, or the object.

FIG. 2 shows a third row seat 16 that includes a base 30 and a seat back 32 that are shown in solid lines in an upright position and is shown in dashed lines in a partially folded position, and phantom lines in a fully folded position. In the upright position, the child seat 36 is secured to the seat 16. As the seat begins to fold, the seat back 32 rotates in a counterclockwise direction, as shown in FIG. 2, to a position that would cause interference with the child seat 36 unless the child seat 36 is removed. The seat folding operation continues with the seat back 32 rotated so that load floor segment 44 is in a horizontal and lowered position with the foam portion 42 of the seat back 32 disposed in the rear stowage well 40. In this position, the load floor segment 44 forms part of the load floor 46 of the vehicle 10.

Figure 3:
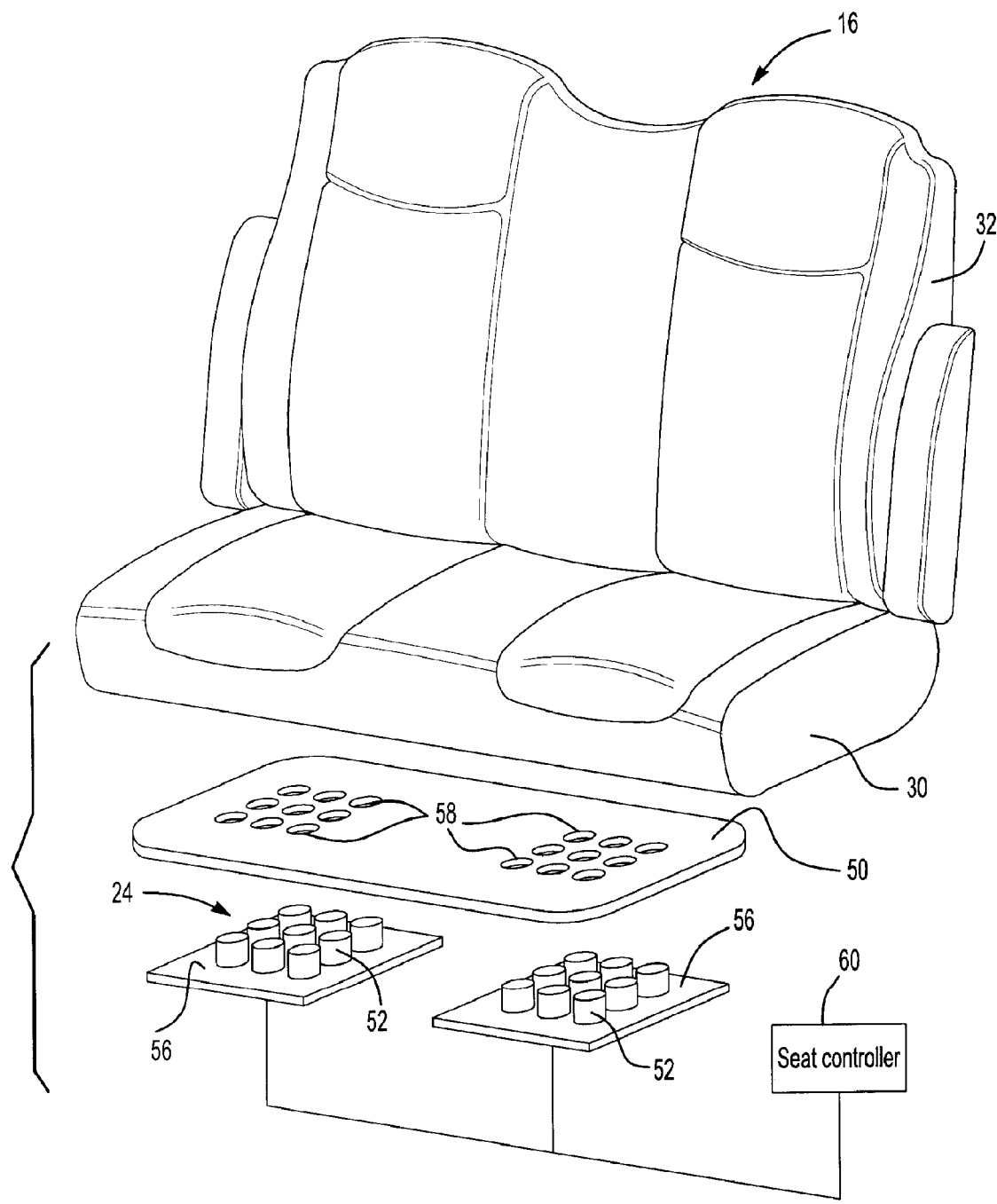
FIG. 3 is an exploded perspective view of a row of vehicle seats provided with a pair of arrays of weight sensors.

Referring to FIG. 3, a rear row of seats 16 is shown to include a base 30 and a back 32. The base 30 includes a foam bun that forms a supporting seat body that is covered by fabric, vinyl, or leather, as is well known in the art. Two weight sensor arrays 24, made according to one embodiment of the invention, include a seat base support panel 50 and a plurality of weight sensors 52. The weight sensors 52 are supported on two trays that hold the weight sensors 52 in openings 58 formed in the seat base support panel 50. The weight sensors 52 are operatively connected to electronic seat controller 60. The electronic seat controller 60 is interfaced with the seat control system, as will be more fully described with reference to FIG. 5 below.

Figure 4:
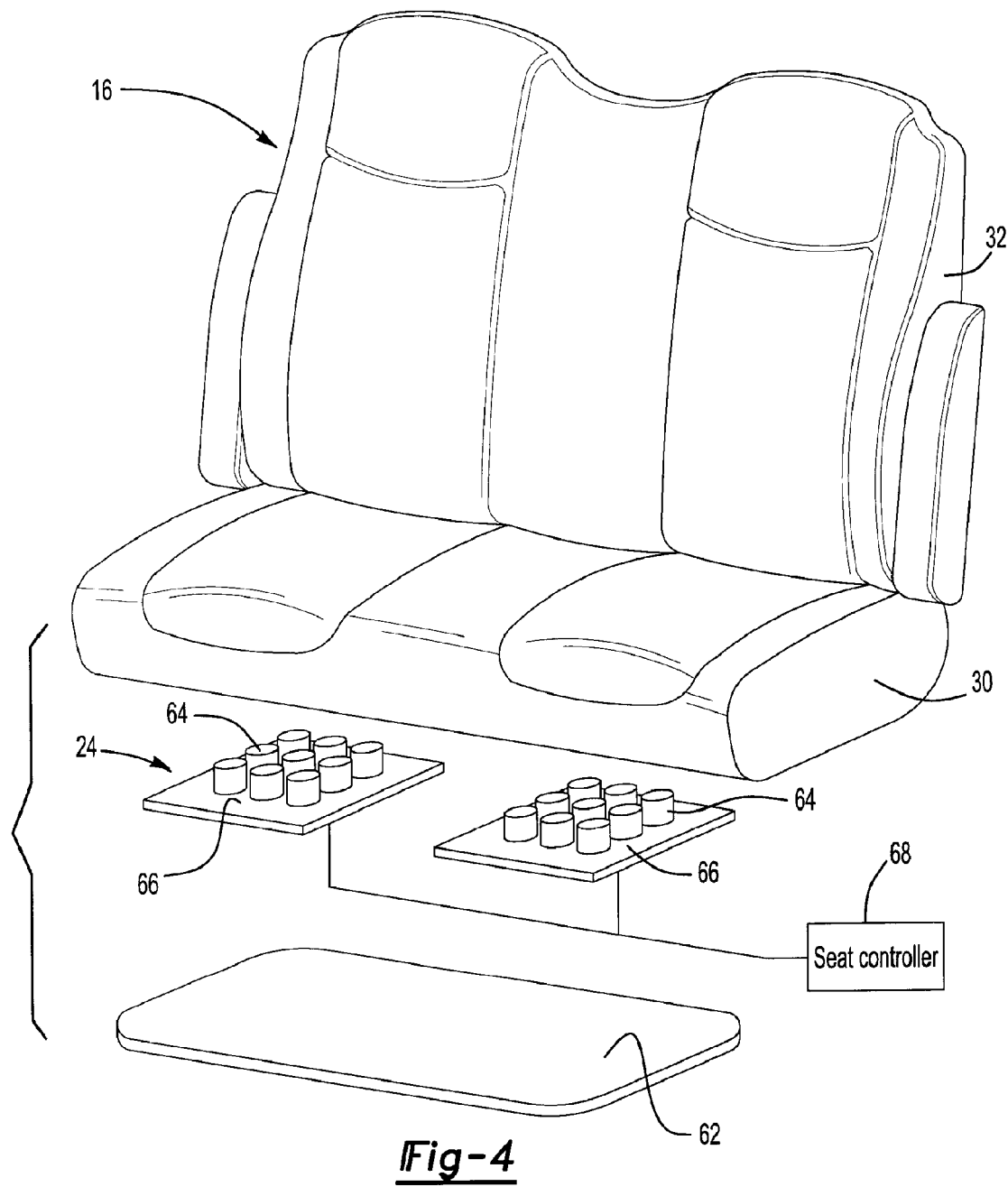
FIG. 4 is an exploded perspective view of an alternative embodiment of a row of vehicle seats provided with a pair of arrays of weight sensors.

Referring to FIG. 4, an alternative embodiment of the rear seat 16 is shown to include a seat base 30 and seat back 32, as previously described. The alternative embodiment of a seat base support panel 62 shown in FIG. 4 supports weight sensors 64 that are retained on two trays 66. The weight sensors 64 are interfaced with seat controller 68.

In FIGS. 3 and 4, the weight sensors 52 and 64 are used to sense the presence of a foreign object on the seat 16. If a foreign object of more than a predetermined weight is placed on the seat base 30, the weight sensor will provide a signal to the seat controllers 60 and 68. If during a seat movement procedure a lightweight object is on the seat and pressed against the seat, a signal may also be sent to the seat controllers 60 and 68.

Figure 5:
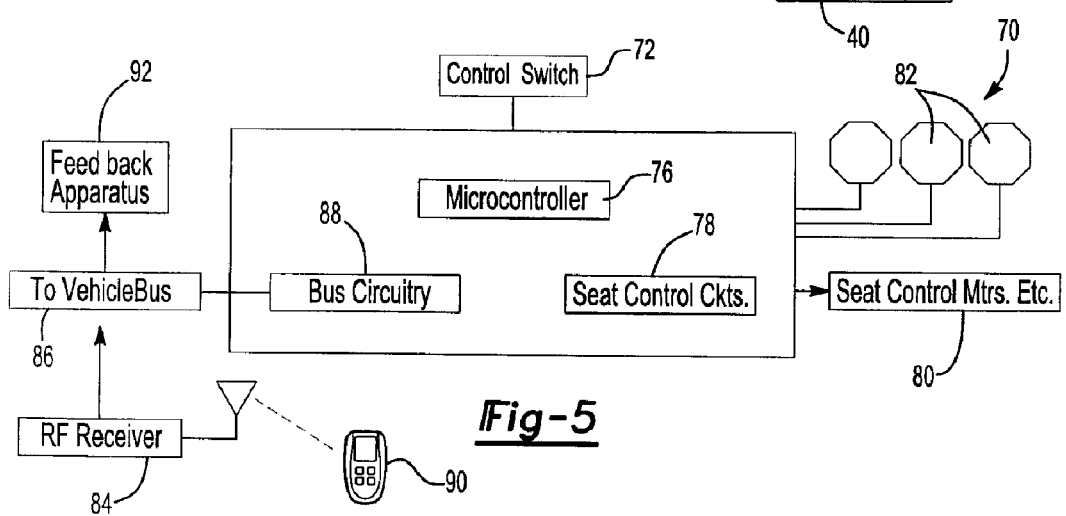
FIG. 5 is a schematic representation of a seat control system made according to one embodiment of the present invention.

Referring to FIG. 5, a seat control system 70 is shown diagrammatically. Operation of the seat control system 70 begins by actuating a control switch 72. Control switch 72 may be provided on the vehicle in one or more locations to allow operation of the seat folding system 70 by pressing a button on the dash or near a door. The control switch 72 may also be provided on a key fob, if desired.

A microcontroller 76 controls operation of the seat control system 70 to operate a seat control circuit 78. Seat control circuit 78 controls one or more motors 80 that drive linkages supporting different parts of the seat 16. Instead of an electric motor 80, the motor could be a linear motor or cylinder, depending upon the design of the seat 16.

A plurality of seat sensors 82 that may be arranged in an array of weight sensors 24 sense the presence of a foreign object on the seat 16. The seat sensors 82 may be load cells or may be spring-biased elements that provide an output signal when an object of more than a predetermined weight is placed on the seat 16. The seat sensors 82 may also be actuated by a lightweight object that is not more than the predetermined weight required to trigger the sensors. The lightweight object when contacted, or pinched, by the seat folding mechanism may provide an indication of a foreign object on the seat. For example, if the seat back 32 pivots to the position shown in dashed lines in FIG. 2, a lightweight object may be pressed into engagement with the seat base 30 sufficiently to cause the seat sensors 82 to provide an indication of a foreign object on the seat.

A passive Rf receiver 84 establishes a limited area around the vehicle 10 in which Rf communication with a transponder 90 may occur. The limited area is shown in FIG. 1 as a cross-hatched area surrounding the vehicle and extending around the vehicle, for example, from 4 to 10 feet away from the vehicle.

The microcontroller 76 is connected to the vehicle bus by a seat-to-vehicle bus interface 86. Bus circuitry 88 is provided in the seat control system to integrate the seat electronics with vehicle electronics.

The transponder 90 may be part of a key fob-type device. The transponder 90 includes a coil and an integrated chip that provides Rf communication with the passive Rf receiver of the vehicle. Whenever the transponder 90 is within the limited range of the Rf receiver, the transponder may be turned on and provide a Rf signal to the passive Rf receiver 84. While the transponder 90 is within range, the seat control system 70 permits the microcontroller 76 to operate the seat control circuit and the motors 80 that drive the seat folding mechanism.

A feedback apparatus 92 is provided as part of the seat control circuit 78 to provide an operator perceptible output that can warn the operator that the seat folding operation was not completed. The feedback apparatus 92 may provide an indication that a foreign object is on the seat or another reason for the failure of the seat to complete its seat folding operation. For example, the feedback apparatus may provide information to advise the operator that the seat folding operation was interrupted because the transponder 90 was moved outside of the limited transmission zone of the passive Rf system. The feedback apparatus 92 may be provided on the vehicle dash as a text message or warning light. Alternatively, the feedback apparatus 92 may be part of the transponder 90 that can provide a message in the form of an icon or text message indicating the status of the seat control circuit 78. The feedback apparatus 92 could also be an audio output such as a voice message that is transmitted over the vehicle audio system. In another alternative, the feedback apparatus 92 could be a telephone dialer that dials a telephone number of an operator's cell phone to provide an audio or visual message as to the status of the seat control circuit 78 or position of the seat 16.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for controlling movement of a seat disposed in a vehicle that has a power-driven folding apparatus that is controlled by an electronic seat control module, the system comprising:

a manually actuated switch that is actuated to initiate operation of the power-driven folding apparatus and may be released after actuation during operation of the power-driven folding apparatus without effecting operation of the power-driven folding apparatus;

a transponder that is carried by a user of the vehicle;

a transmitter/receiver that communicates with the transponder and provides a proximity signal to the electronic seat control module when the transponder is within a limited distance from the transmitter/receiver; and the electronic seat control module preventing operation of the power-driven folding apparatus when no proximity signal is provided to the electronic seat control module.

2. The system of claim 1 wherein the transponder is part of a passive entry Rf system that is operative to unlock the vehicle when the proximity signal is received.

3. The system of claim 1, wherein the operation of the power-driven folding apparatus continues until completed unless the transponder is moved beyond the limited distance from the transmitter/receiver.

4. The system of claim 1 wherein the transponder has a plurality of manually actuated switches and any one of the switches may be actuated to stop operation of the power-driven folding apparatus during operation of the power-driven folding apparatus.

5. The system of claim 1 wherein the manually actuated switch is assembled to the vehicle and may be actuated to stop operation of the power-driven folding apparatus during operation of the power-driven folding apparatus.

6. In the system of claim 1, further comprising an operator perceptible output mechanism that communicates status information to the user regarding the status of the power-driven folding apparatus in the event the electronic seat control module prevents operation of the power-driven folding apparatus.

* * * * *